United States Patent Office 2,762,739
Patented Sept. 11, 1956

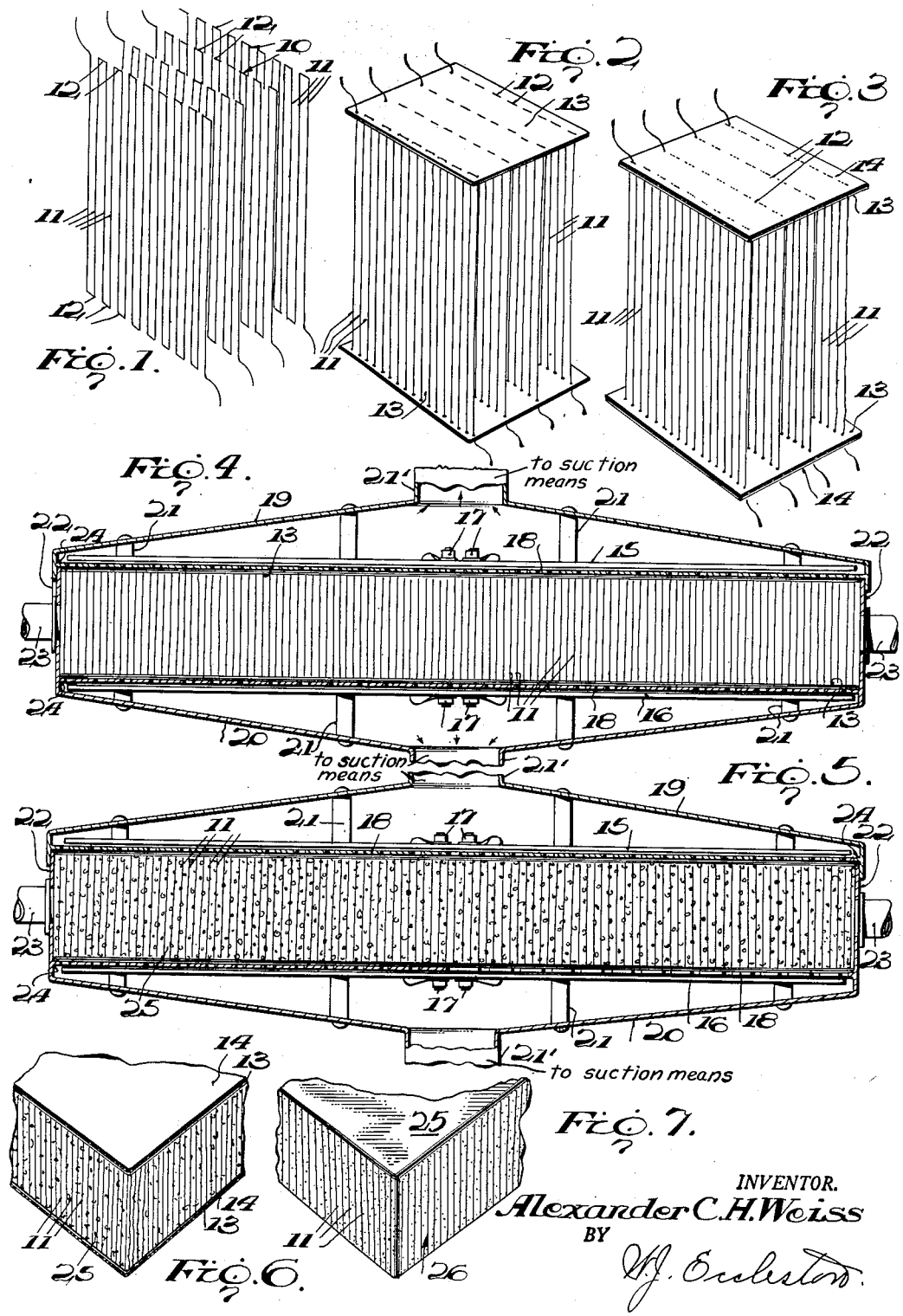

2,762,739

FIBER-REINFORCED STRUCTURAL PANEL AND METHOD OF MAKING SAME

Alexander C. H. Weiss, Takoma Park, Md., assignor to the United States of America as represented by the Secretary of the Army Application November 19, 1953, Serial No. 393,251

9 Claims. (Cl. 154—90)

(Granted under Title 35, U. S. Code (1952), sec. 266)

The invention described herein, if patented, may be manufactured and used by or for the Government for governmental purposes, without the payment to me of any royalty thereon.

My invention relates to molded structural panels and the like, and to a method of producing the same.

A primary object of the invention is to provide a lightweight structural panel of molded plastic material, reinforced and strengthened by tensed glass fibers or the like, extending between opposite faces of the panel, at substantially right angles thereto.

A further object of the invention is to provide a novel and simplified method of producing the above-mentioned structural panel.

A still further object is to provide a lightweight structural panel formed of thermosetting plastic material, or the like, having a foaming agent present in the same and serving to expand the plastic material in the mold and effect the interlocking and bonding of the material with the multiplicity of tensed fibers extending through the panel.

A still further object of the invention is to provide a product of the above-mentioned character and method of making the same which are economical and practical for large scale manufacturing purposes.

Other objects and advantages of the invention will be apparent during the course of the following description.

In the accompanying drawings, forming a part of this application, and in which like numerals are employed to designate like parts throughout the same, Figure 1 is a fragmentary perspective view, partly diagrammatic, of reinforcing fibers or the like, employed in the making of my panel, Figure 2 is a similar perspective view showing the reinforcing fibers sewn into flexible backing sheets of woven fabric, or the like, Figure 3 is a further perspective view similar to Figure 2 showing the flexible backing sheets coated and impregnated with rubber, synthetic rubber or like moisture impervious material, Figure 4 is a longitudinal vertical sectional view, partly diagrammatic, showing the reinforcing fibers and coated backing sheets of Figure 3 supported in a molding apparatus employed in the practice of my method, prior to the introduction of the plastic material having the foaming agent therein, Figure 5 is a similar sectional view of the product and apparatus after the plastic material with the foaming agent therein has been introduced between the flexible backing sheets, Figure 6 is a fragmentary corner perspective view of the panel after removal from the mold and hardening of the plastic material, and, Figure 7 is a similar perspective view showing the backing sheets removed by planing or the like from the opposite faces of the panel.

In the drawings, where for the purpose of illustration is shown a preferred embodiment of the invention, attention is directed first to Figure 1, wherein the numeral 10 designates diagrammatically rows of equidistantly spaced parallel fibers or strands 11, preferably formed of glass fibers or the like. The strands 11 preferably comprise spun Fiberglas, and each strand preferably consists of about 204 fine glass filaments grouped or twisted together in a conventional manner to make up the individual strands 11. The strands 11 of each continuous row 10 are disposed in a zig-zag manner for extending between opposite faces of the structural panel, and the ends of the strands 11 of each row 10 are connected by short transverse lengths or stitches 12. The arrangement is such that each row 10 comprises a continuous length or strand containing the parallel strands 11, and the strands 11 are preferably uniformly spaced in each row 10, although the spacing of the strands 11 and rows 10 is not critical, and may be varied somewhat if desired. I prefer to provide a sufficient number of the rows 10 of strands 11 so that the finished structural panel will have approximately 300 of the strands 11 per square inch of the surfaces between which the strands extend. This is not critical, however, and the number of strands per square inch may be varied somewhat as found desirable.

In Figure 2, the numeral 13 designates flexible backing sheets of woven fabric, such as woven nylon, cotton fabric or the like. The backing sheets 13 extend continuously over opposite sides of the structural panel, and may be of any preferred dimensions, depending upon the size of the panel sections to be fabricated. As shown in Figure 2, the end sections or stitches 12 are sewn into the fabric backing sheets 13, which are parallel, and the strands 11 are thus permanently connected with the backing sheets and extend between the same, at right angles thereto when in the straight or tensed position.

In Figure 3, I have shown the backing sheets 13 coated and impregnated with a suitable moisture impervious composition 14, such as rubber, synthetic rubber or the like, and this composition preferably covers and encloses the stitches 12.

In Figure 4 there is shown partly diagrammatically a combined supporting and molding apparatus employed in the practice of my method. This apparatus comprises top and bottom electrically heated mold plates 15 and 16 of any preferred dimensions. Terminals 17 of the electrical heating element or wire contained within the mold plates 15 and 16 are provided, so that current may flow to the electrical heating element within each plate 15 and 16. Arranged inwardly of the mold plates 15 and 16 and spaced slightly therefrom are perforated support plates 18, preferably provided over their entire areas with rather closely spaced perforations. The support plates 18 are substantially coextensive with the plates 15 and 16, as shown. The apparatus further comprises a pair of opposed suction heads 19 and 20, rigidly secured to the mold plates 15 and 16 by suitable insulated fastener elements 21. The suction heads 19 and 20 carry tubular exhaust ducts or conduits 21', rigidly secured thereto centrally of the heads 19 and 20, and adapted for connection with suitable suction means, not shown.

The suction heads 19 and 20 have airtight end walls 22, into which pipes 23 open, and with which these pipes are rigidly connected in any preferred manner. The pipes 23 serve to conduct the fluent plastic material with the foaming agent, to be described, to the interior of the apparatus.

The perforated plates 18 have their marginal edges rigidly secured at 24 to the side and end walls of the suction heads 19 and 20, by welding, or the like. Airtight joints between the margins of the plates 18 and suction heads are thus provided, and the perforated plates 18 are held slightly spaced from the imperforate mold plates 15 and 16, so that suction within the heads 19 and 20 will be effective through the perforated plates 18 for holding the backing sheets 13 thereagainst.

In the practice of my method, the reinforcing strands 11 and coated backing sheets 13 are arranged inside of the apparatus shown in Figure 4, between the perforated plates 18, and the backing sheets 13 may be of substantially the same dimensions as the perforated plates 18. Suction is now applied to both ducts 21' of the suction heads 19 and 20, and this suction will be effective through the apertures of the plates 18 to hold the coated backing sheets 13 in engagement with the perforated plates 18. The backing sheets 13 will lie flat against the perforated plates 18, under the influence of the vacuum within the heads 19 and 20, and the spacing between the plates 18 is such that the multiplicity of strands 11 will be straight, and preferably somewhat tensioned.

A suitable thermosetting plastic material in the liquid state containing a foaming agent is now introduced through the pipes 23 to the space between the backing sheets 13. This material is designated by the numeral 25, Figure 5. The material may be alkyd-diisocyanate, a thermosetting plastic material having a foaming agent therein. Another suitable material is a thermosetting phenolic resin with about 20% Hycar (a rubber base constituent) preferably Hycar OR-15. This thermosetting plastic material, if used, is compounded with a suitable foaming agent such as "Unicel ND," which releases nitrogen within the plastic material and forms a unicellular mass. "Unicel ND" is described in Report No. 47-3, May 1947, of the Rubber Chemicals Division, E. I. du Pont de Nemours & Co., Wilmington, Delaware, which has been published. Other foaming agents are known to those skilled in the art and may be used in lieu of "Unicel ND."

The material 25 flows into the space between the backing sheets 13 in the liquid state, by way of the pipes 23, and preferably entirely fills the space between the backing sheets. After introduction into the space between the backing sheets, the foaming agent in the plastic material causes the plastic material to foam and expand, and pressure is created between the backing sheets 13. The mass of plastic material becomes cellular and foamy, and the material becomes thoroughly interlocked with the multiplicity of reinforcing strands 11 which are under tension and straight.

Heat is now applied to the article by means of the electrical heating elements within the plates 15 and 16, and this heat penetrates through the backing sheets 13 and through the cellular plastic mass and effects setting or hardening of the same, with the tensed reinforcing strands 11 firmly bonded and anchored therein.

When the mold has cooled, the article or panel, which is now rigid, is removed from the apparatus, and now has the form illustrated in Figure 6, wherein the backing sheets 13 are still adhering to the top and bottom faces of the panel. If preferred, the panel may be used in this condition for whatever structural application may be contemplated. For the purpose of appearance, and to facilitate a wider range of usage, I prefer to plane off the coated backing sheets 13, in the manner indicated in Figure 7, and when this is done, the finished structural panel 26 is produced, and the panel is materially strengthened and reinforced by the tensed strands 11 which are now permanently molded therein. The panel 26 may be made in substantially any desired thickness, length and width, and the same is lightweight and extremely strong in compression, bending and shear. It is capable of a wide variety of uses, such as in flooring, wall construction, aircraft structural panels and the like. It is rigid and resistant to delamination.

While I have shown and described my panel as comprising thermosetting plastic material having a foaming agent, and tensed glass fiber reinforcing filaments, it should be understood that the product can be made with other types of plastic material having a foaming agent, such as those which may set at room temperatures, or the like. I may also employ other types of reinforcing strands, such as strands of nylon, cotton and the like.

It is to be understood that the form of the invention herewith shown and described is to be taken as a preferred example of the same, and that various changes in the shape, size and arrangement of parts of the apparatus may be resorted to, as well as changes in the method steps, without departing from the spirit of the invention or scope of the subjoined claims.

Having thus described my invention, I claim:

1. A method of making a lightweight reinforced structural panel comprising holding flexible backing sheets connected by flexible strands separated in opposed spaced relation in substantially parallel planes so that the strands are substantially taut and substantially at right angles to the planes of said backing sheets, introducing a plastic material in the freely flowing state into the space between the backing sheets until such space is substantially filled and the strands are substantially enclosed within the plastic material, and hardening the plastic material to complete the panel.

2. A method of making a lightweight structural panel comprising arranging flexible backing sheets connected by flexible strands in spaced relation in substantially parallel planes with the strands substantially taut and substantially at right angles to the planes of said backing sheets, introducing plastic material containing a foaming agent in the liquid state between the backing sheets and substantially entirely enclosing the taut strands within the plastic material, and then hardening the foamed plastic material to complete the panel.

3. A method of making a lightweight rigid structural panel comprising separating flexible backing sheets connected by spaced flexible strands which are substantially normal to the planes of said backing sheets and rendering the strands substantially taut, introducing plastic material in the liquid state containing a foaming agent between the backing sheets and substantially filling the space between the backing sheets with the plastic material and enclosing the strands within the plastic material, the thickness of the panel being defined by the lengths of the taut strands, the foaming agent imparting to the plastic material a cellular construction, hardening the plastic material in the cellular state, and then removing the backing sheets for completing the panel.

4. A method of making a lightweight reinforced structural panel comprising securing the ends of spaced flexible strands of substantial strength to a pair of substantially parallel backing sheets, holding the backing sheets separated to tension the strands, the strands then extending between the backing sheets and being substantially at right angles thereto, introducing plastic material in the freely flowing state and containing a foaming agent into the space between tthe separated backing sheets and enclosing the strands within the plastic material, causing the foaming agent to blow the plastic material to make it cellular, and then hardening the plastic material.

5. A method of making a lightweight rigid structural panel comprising connecting a pair of flexible backing sheets by means of flexible strands spaced apart over substantially the entire areas of the backing sheets, separating the backing sheets in substantially parallel relation with the strands extending substantially at right angles thereto and thereby tensioning said strands, introducing a foamable thermosetting plastic material between the backing sheets while they are held separated until substantially all of the space between the backing sheets is filled with the foamable plastic material and the plastic material surrounds and encloses the strands, causing the plastic material to expand to become cellular, and then applying heat to effect hardening of the plastic material to complete the panel.

6. A lightweight rigid structural panel comprising a pair of backing sheets arranged in spaced substantially parallel relation, a multiplicity of closely spaced reinforcing strands connected with the backing sheets and extending therebetween at substantially right angles thereto and being substantially taut, and a substantially rigid body portion of cellular plastic material arranged between said backing sheets and having the reinforcing strands substantially completely enclosed therein, the strands serving to materially strengthen the panel and the lengths of the taut reinforcing strands substantially defining the thickness of the completed panel.

7. As an article of manufacture, a substantially rigid body portion of molded plastic material, said body portion being of substantial thickness and having opposite substantially parallel faces, and a multiplicity of glass fiber reinforcing strands embedded within said body portion in closely spaced relation and extending between said substantially parallel faces at substantially right angles thereto and being substantially taut and extending in the direction of the thickness of said body portion.

8. A lightweight rigid structural panel comprising a substantially rigid body made of molded cellular plastic material, said body having opposite substantially parallel faces spaced apart far enough so that the body is of substantial thickness, a multiplicity of reinforcing substantially inextensible flexible strands extending in straight parallel lines between said substantially parallel faces substantially at right angles thereto, there being a considerable number of such strands per square inch of area of said substantially parallel faces, the strands being surrounded by and interlocked with the molded cellular plastic material.

9. A method of making a lightweight reinforced rigid structural panel comprising first, uniting two flexible backing sheets in substantial parallelism with a multiplicity of flexible substantially inextensible strands extending substantially parallel to each other when the sheets are separated; second, holding the sheets separated, to the maximum extent permitted by the tensioned strands, by imposing suction simultaneously on both sheets; third, introducing plastic material in the liquid state and containing a foaming agent into the space between the held-apart sheets and substantially filling said space, the foaming agent imparting a cellular form to the plastic filling; fourth, hardening the plastic filling; and finally discontinuing the suction and removing the panel.

References Cited in the file of this patent

UNITED STATES PATENTS

| | | |
|---|---|---|
| 662,963 | Preston et al. | Dec. 4, 1900 |
| 1,361,971 | Dickey | Dec. 14, 1920 |
| 2,131,024 | Cordts | Sept. 27, 1938 |
| 2,376,653 | Boyer | May 22, 1945 |
| 2,460,309 | Rapp | Feb. 1, 1949 |
| 2,493,032 | Rheinfrank | Jan. 3, 1950 |
| 2,498,621 | Kropa et al. | Feb. 21, 1950 |
| 2,692,219 | Slayter et al. | Oct. 19, 1954 |